(No Model.)
J. C. WILSON.
SIGNAL TRANSMITTER.
No. 320,032. Patented June 16, 1885.
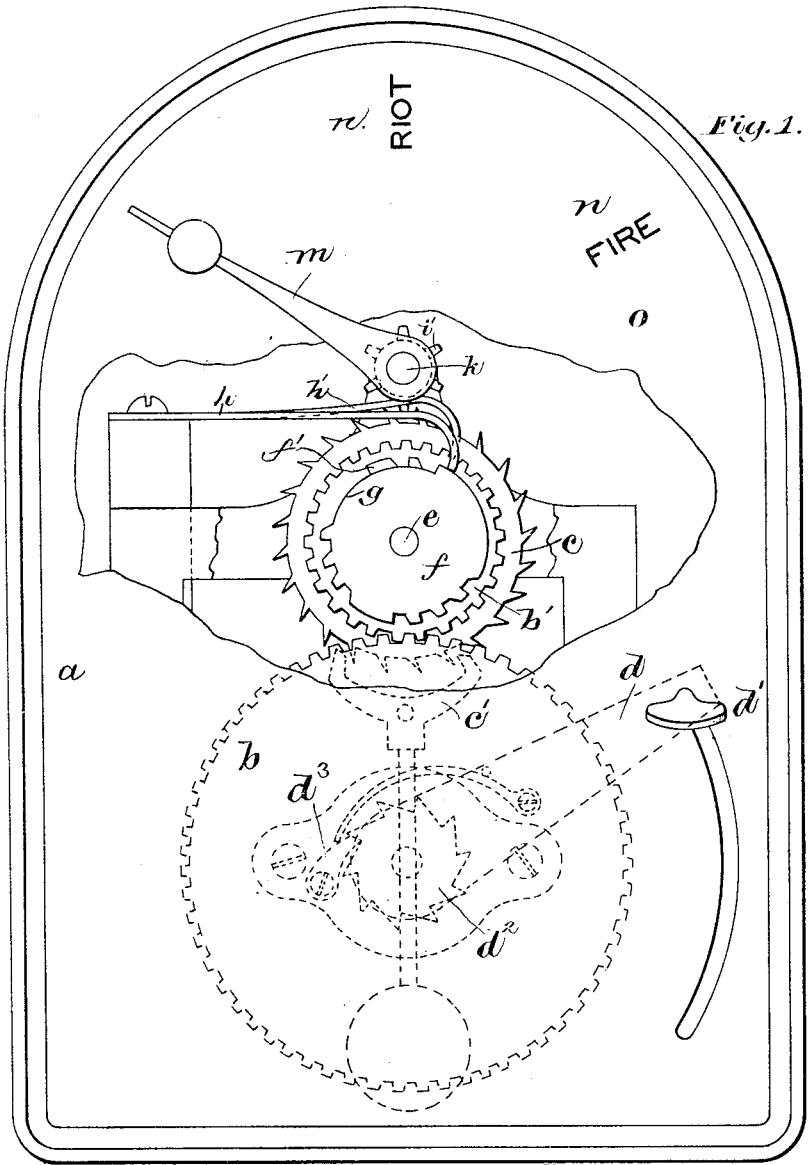
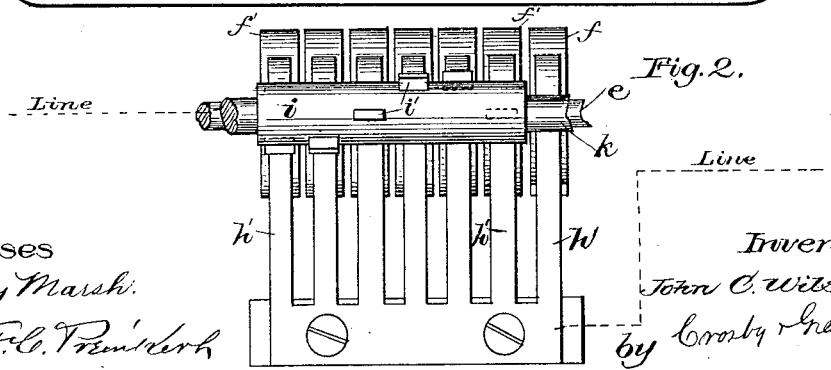

though effective, involves considerable ex-
UNITED STATES PATENT OFFICE.

JOHN CORNELIUS WILSON, OF BOSTON, MASSACHUSETTS.

SIGNAL-TRANSMITTER.

SPECIFICATION forming part of Letters Patent No. 320,032, dated June 16, 1885.

Application filed May 5, 1884. (No model.)

*To all whom it may concern:*

Be it known that I, JOHN C. WILSON, of Boston, county of Suffolk, and State of Massachusetts, have invented an Improvement in Signal-Transmitters, of which the following description, in connection with the accompanying drawings, is a specification, like letters on the drawings representing like parts.

My invention relates to a transmitting device or signal-box such as may be employed in district or municipal telegraphy, the apparatus being intended to transmit any desired one of a number of different predetermined signals, indicating the wants that may commonly be supplied, together with a signal indicating the location of the box or its number.

Multiple signal-boxes have been devised in which a drum provided with a series of different signaling-surfaces arranged in planes passing through the axis of the said drum cooperates with a single movable contact-spring revolving on an axis at right angles to that of the said drum, so that by the revolution of the said spring a signal is transmitted corresponding to that one of the surfaces of the drum which may at the moment of transmission lie in the path of the spring, the said drum remaining stationary while the spring is revolving or while a signal is being transmitted, but being movable at other times for the purpose of selecting or determining which signal shall be transmitted at the next revolution of the spring. An apparatus of this kind, though effective, involves considerable expense in construction, and it is difficult to arrange the parts simply and compactly from the fact that one rotary shaft has to be at right angles to another instead of being all parallel and included between parallel supporting-plates or frame-work.

Another apparatus previously devised for transmitting multiple signals consists of a series of break-wheels, of usual construction, and a corresponding series of contact-springs which are always in mechanical engagement with the said break-wheels, but which have independent circuit-connections, so that the main circuit may be directed through any desired one of the said break-wheels by a suitable circuit-selecting device. This construction is objectionable when any considerable number of distinct signals are to be provided for, as the friction of the entire series of springs requires considerable power to be exerted by the motor actuating the break-wheels, and the circuit-connections are numerous and complicated and likely to become deranged.

The present invention has for its object to remove the difficulties or objections above referred to; and it consists, essentially, of a box or motor having a series of signaling-surfaces or break-wheels, and a corresponding series of contact-springs normally disengaged from the said surfaces, in combination with a selecting device by which any desired one of the said springs may be mechanically placed in engagement with the corresponding surface, which will transmit its signal while the others remain inoperative. In this arrangement the motor has to overcome only the usual friction of a single spring, and the entire series of springs may be electrically connected with one portion of the circuit, they themselves constituting a series of independent branches which are brought into operation at the desired time by the movement of the springs, so that the necessity of a series of branch wires each containing independent circuit-closers is avoided.

The invention further consists in certain combinations of mechanical devices which are applicable to other apparatus than multiple signal boxes or transmitters.

Figure 1 is a front elevation of a signal-box embodying this invention, it being shown as adapted for use in a police-telegraph system; Fig. 2, a detail showing in plan view a portion of the signal-selecting device and co-operating parts.

The box $a$, containing a motor or train of wheel-work, $b\ b'$, terminating in an escapement, $c\ c'$, and having its actuating weight or spring adapted to be wound sufficiently to transmit each signal by an arm, $d$, provided with a finger piece or pull, $d'$, and ratchet $d^2$, which latter is adapted to engage a pawl, $d^3$, on the wheel $b$ of the train, may all be of any suitable or usual construction, as these parts are well known in apparatus of this nature.

One of the arbors, as $e$, of the motor is provided with a series of signaling-surfaces or break-wheels, $f f'$, one of which, as $f$, is preferably notched to produce a number-signal characterizing the box or location from which the signal is received, the said wheel $f$ also having a long notch or insulated space, $g$, either preceding or following the notches that produce the number-signal. The remaining signal-surfaces or break-wheels have raised portions corresponding in position with the long notch $g$ of the wheel $f$, the said raised portions of each wheel $f'$ being notched to produce interruptions in the current to make a special signal, they being, for instance, such as will, when controlling a register in the usual manner, produce the letters of the Morse alphabet or other similar characters, which are different on the different wheels $f'$.

It is necessary to provide means for causing any desired one of the said wheels, and one only, to transmit its signal at each operation of the motor caused or controlled by the pull $d'$. This is accomplished in this instance as follows: The entire series of wheels $ff'$ are connected with the main line at one side of the box, as indicated in Fig. 2, and the continuation of the line on the other side of the box is connected with a series of co-operating members or contact-springs, $h h'$, the former of which, $h$, is adapted to bear continuously on the raised portions of the wheel $f$, thus interrupting the current when the notches of the said wheel $f$ pass beneath it in the rotation thereof. The springs $h'$ normally remain separated from the surfaces of the corresponding wheels, $f'$, so that normally no current can pass from the said springs to the said wheels. If, however, any one of the said springs is pressed down into contact or engagement with the surface of the corresponding wheel, it will co-operate therewith to control the current, which will be interrupted when the notches of the said wheel pass beneath the said springs. Any desired one of the said springs $h'$ may be pressed down to co-operate with the corresponding wheel, $f'$, by means of the signal-selecting device $i$, shown as a cylinder or shaft having a series of projections, $i'$, at different points about its periphery and along its length, so that by successive partial rotations of the said cylinder each one of the said projections will be brought in turn into engagement with a corresponding one of the said springs $h'$, pressing it down into position to co-operate with corresponding signaling surface or wheel $f'$.

In order that the operator may have no difficulty in sending the proper signal, the shaft or arbor $k$ of the signal-selecting device $i$ is provided with a pointer, $m$, which also serves as a handle to rotate the said device, and in its rotation is brought into line with a series of different signals, $n$, marked on a suitable dial, $o$. Thus by turning the pointer $m$ opposite any desired one of the signals $n$ it will be known that the proper one of the springs $h'$ is pressed into engagement with the proper one of the wheels $f'$ to transmit the desired signal.

The cylinder $i$ or projections $i'$ thereof are of insulating material, or are otherwise insulated from the wheels $f f'$. The number-signals may be made on each of the wheels $f'$, instead of on a separate wheel, $f$, as shown.

In another application, No. 129,500, filed April 28, 1884, I have shown a multiple signal device comprising a series of simultaneously-moving break-wheels having co-operating springs normally engaged therewith, and a device for placing one only of the said springs in circuit at one time, the others being then wholly disconnected from the line.

The present invention differs essentially therefrom in that the springs are normally all connected with the line, but disengaged from the wheels, and one only at a time is mechanically moved into engagement with the corresponding wheel. The result attained by the apparatus is substantially the same, but in some cases the one and in some cases the other will be more desirable.

I claim—

1. The motor and series of signaling-surfaces simultaneously moved thereby, combined with the series of co-operating contact-pieces normally disengaged therefrom, and the movable signal-selecting cylinder provided with a pointer and co-operating mechanically with the said contact-pieces for throwing any desired one of the latter into engagement with the corresponding surface, substantially as described.

2. The motor and series of signaling-surfaces simultaneously moved thereby, combined with the series of contact-springs normally disengaged from the said surfaces, and the selecting-cylinder provided with projections corresponding to the said springs, and distributed about the periphery of the said cylinder, whereby any desired one of the said springs may be brought into engagement with the corresponding one of the said surfaces by the rotation of the said cylinder, substantially as described.

3. The motor and series of break-wheels rotated simultaneously thereby, combined with a series of contact-springs, one of which is normally engaged with the corresponding wheel, and the others of which are normally disengaged from the corresponding wheels, and a selecting device mechanically co-operating with the said springs for throwing any desired one of the latter into engagement with the corresponding wheel, substantially as described.

4. The combination, with a series of contact-springs and co-operating members normally disengaged therefrom, of a cylinder provided with projections distributed along and around its surface, and co-operating with the said springs, as described, each projection co-operating with one of the said springs to mechanically press it into engagement with its co-operating member as the said cylinder is turned to different positions on its axis.

In testimony whereof I have signed my name to this specification in the presence of two subscribing witnesses.

JOHN CORNELIUS WILSON.

Witnesses:
Jos. P. LIVERMORE,
W. H. SIGSTON.